United States Patent [19]

Krager

[11] Patent Number: 5,209,005
[45] Date of Patent: May 11, 1993

[54] SYSTEM FOR POSITIONING A FISHING NET

[76] Inventor: William R. Krager, 3443 Bobbie Cir., Anchorage, Ak. 99515

[21] Appl. No.: 886,234

[22] Filed: May 21, 1992

[51] Int. Cl.$^5$ .............................................. A01K 71/00
[52] U.S. Cl. ............................................ 43/7; 43/9.1; 24/908
[58] Field of Search ............... 43/7, 9.1, 14, 44.9; 24/908, 115 H, 136 K, 17 B

[56] References Cited

U.S. PATENT DOCUMENTS

| | | |
|---|---|---|
| 2,408,367 | 10/1946 | Brickman . |
| 2,572,889 | 10/1951 | Strykower ........................ 24/115 H |
| 3,213,560 | 10/1965 | Phillips . |
| 3,397,026 | 8/1968 | Spina ................. 24/115 H |
| 3,545,120 | 12/1970 | Takaoka ............... 43/44.9 |
| 4,517,759 | 5/1985 | Wall . |
| 4,562,660 | 1/1986 | Cantor et al. . |
| 4,644,679 | 2/1987 | Ban . |
| 4,674,801 | 6/1987 | DiPaola et al. ................... 24/115 H |
| 4,693,031 | 9/1987 | Koetje . |
| 4,763,432 | 8/1988 | Barclay . |
| 4,805,334 | 2/1989 | Barclay ..................................... 43/7 |
| 5,033,221 | 7/1991 | Barclay ..................................... 43/7 |

Primary Examiner—Richard K. Seidel
Assistant Examiner—Chuck Y. Mah
Attorney, Agent, or Firm—William D. Hall

[57] ABSTRACT

A fishing net is held in place below a corkline by a series of holding devices. Each holding device has a crimped cylinder from which three loops extend. One of these loops may be tied around the corkline to position the crimped cylinder below the corkline. The other two loops cooperate with similar loops from other adjacent holding devices to position the fishing net below the holding devices.

6 Claims, 2 Drawing Sheets

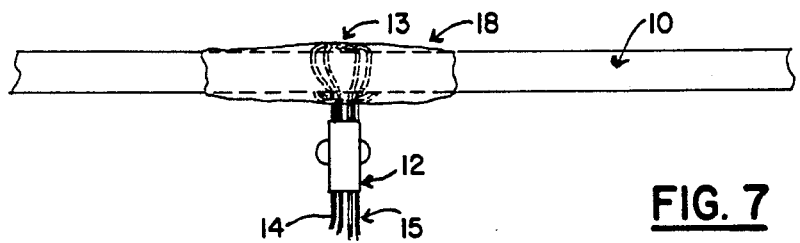
FIG. 7
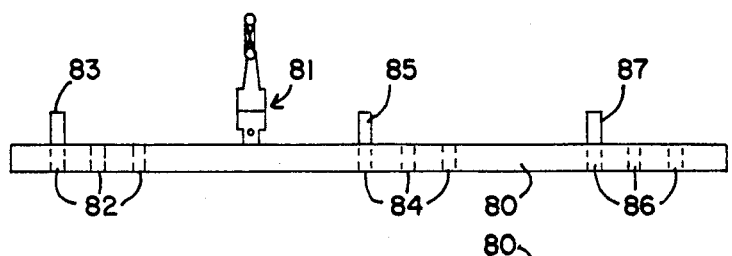
FIG. 8
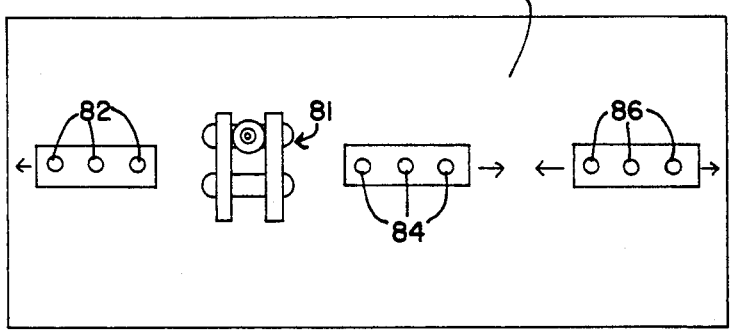
FIG. 9
FIG. 10
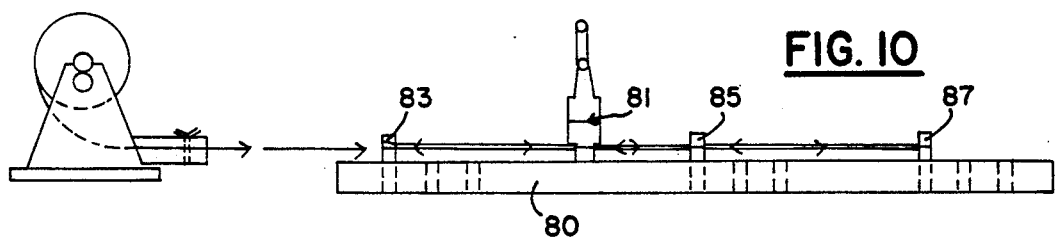
FIG. 11
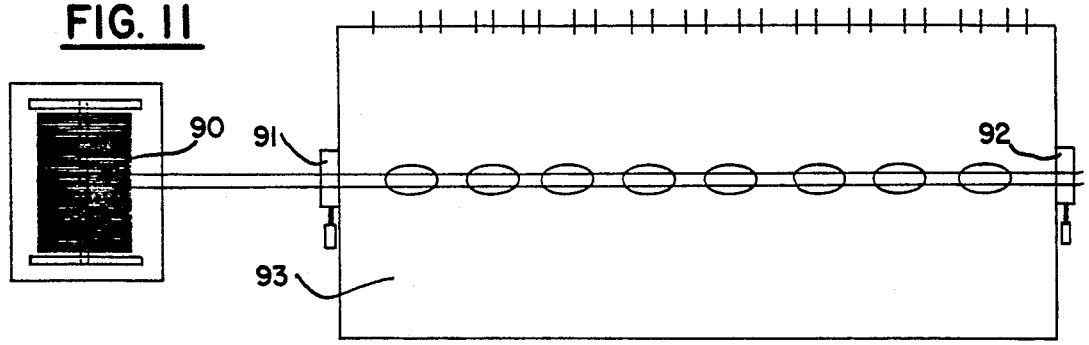

SYSTEM FOR POSITIONING A FISHING NET

BACKGROUND OF THE INVENTION

The prior art commercial practice for hanging a fishing net from a floating corkline is well stated in lines 10 to 52 of column 1 of U.S. Pat. No. 4,763,432 to Barclay granted Aug. 16, 1988 and entitled Fishnet Hanging System. The forty-two lines from that patent, hereinabove cited, are incorporated herein by reference.

The aforesaid Barclay patent teaches that a hanging cord is threaded through the top selvage of the net or web of the fishnet assembly and is secured at regularly spaced locations to separate anchor blocks which in turn are secured to the fishnet corkline.

Ban U.S. Pat. No. 4,644,432 in FIGS. 4-7 discloses the use of interlocking loops to engage successive sections of a net to a cork or handline.

Brickman U.S. Pat. No. 2,408,367 and Barclay, previously cited, (element 45, FIGS. 12-15) disclose the use of clamps to secure the monoline together.

Phillips U.S. Pat. No. 3,213,560 discloses the use of tie strings 22 to secure a net to a leadline.

Koetje U.S. Pat. No. 4,693,031 uses connector means 12 for securing a net to a longline.

Cantor et al. U.S. Pat. No. 4,562,660 uses a single long connector line to secure several net sections to a cork or lead-line.

Wall U.S. Pat. No. 4,517,759 uses a stop means through a leadline to prevent a net securing line from slipping along the leadline.

SUMMARY OF THE INVENTION

This invention relates to a system for hanging a fishing net from a corkline.

The invention utilizes a plurality of holding devices that are suspended from the corkline. Each holding device has three loops projecting from a sleeve. One loop projects upwardly from the sleeve and is used to hang the sleeve from the corkline. The other two loops project downwardly from the sleeve. The first of these two downwardly projecting loops is much shorter than the second loop. The second loop is passed through the first loop and also through several openings at the top of the fishing net; the first loop of an adjacent holding device passing through the aforesaid second loop of the first holding device but only after that second loop has passed through the openings in the net.

BRIEF DESCRIPTION OF THE DRAWINGS

FIG. 7 is another view of the loop 13 holding the crimped piece 12; but with emphasis on bonding material 18 to hold loop in place on the corkline 10.

FIG. 8 is a side view of a machine for making the loops of FIG. 3.

FIG. 9 is a top view of the device of FIG. 8.

FIG. 10 is a side view of FIGS. 8 and 9 with a feed roll added.

DETAILED DESCRIPTION OF THE INVENTION

The invention employs a conventional corkline 10 from which net 17 hangs. The net is a web the upper part of which is the conventional selvage 16. For the purpose of this description and the claims the selvage 16 is considered part of the "net."

Figure 3:
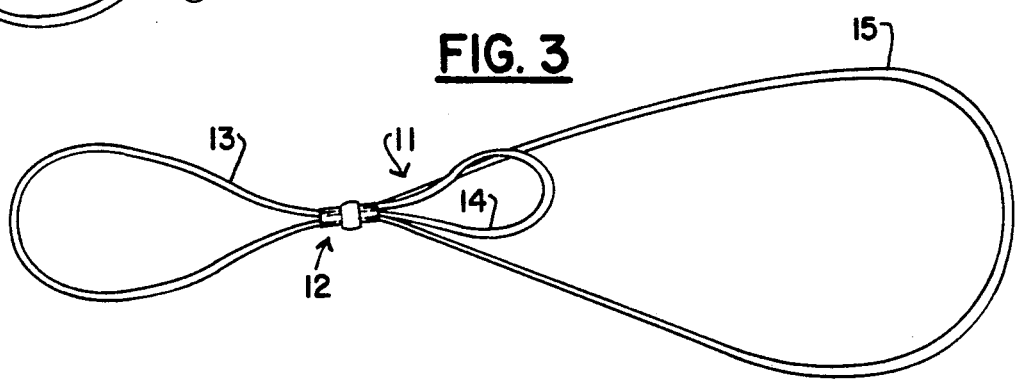
FIG. 3 is a side view of the holding device of this invention.

The net 17 hangs from the corkline by a series of holding devices 11 as shown in more detail in FIG. 3, where there is shown a crimped cylinder 12 having one loop 13 extending in one direction away from crimped cylinder 12; and first and second loops 14 and 15, respectively, extending away from crimped cylinder 12 in another direction.

Figure 2:
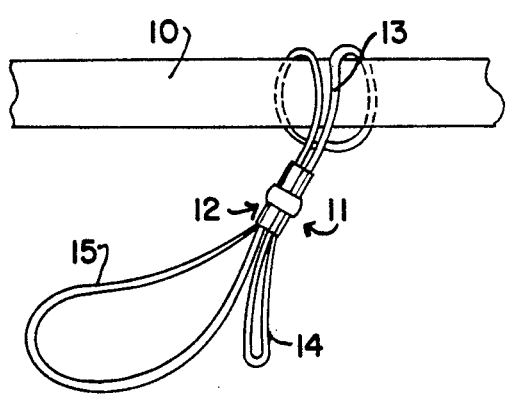
FIG. 2 shows how the holding device 12 is tied to the corkline 10 by loop 13.

The function of the loop 13 is to hold the crimped cylinder 12 below the corkline 10. As shown in FIG. 2 the loop 13 is tied around corkline 10 to hold the crimped cylinder 12 in place.

Figure 1:
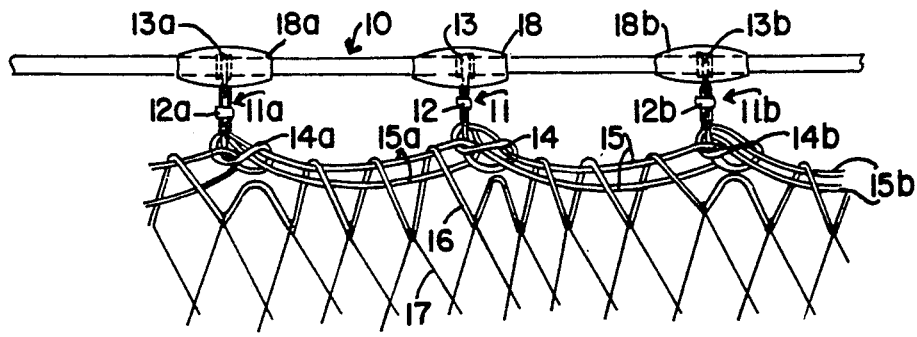
FIG. 1 is a side view of a fishing net 16, 17 held from a corkline 10 by the system comprising the invention.

In FIG. 1 is shown the corkline 10 with three holding devices such as 11. All three holding devices 11, 11a and 11b are identical; which means that loops 13, 13a and 13b are identical; that loops 14, 14a and 14b are identical and that loops 15, 15a and 15b are identical.

To illustrate how the holding device 11 is connected to the net 16, 17 it is noted that loop 14 is passed through the free end of loop 15a of holding device 11a. The loop 15 is then passed through loop 14 and then through several openings in the net 16, 17 and is ultimately held in place by loop 14b.

To secure the loops 13, 13a and 13b in place, a bonding agent 18 (FIGS. 1, 7) is applied to the loops 13, 13a and 13b and to the corkline 10. The preferred bonding agent is a hot glue applied with a brush while at 400° F. A suitable glue is known as Super Bond sold by Riddling Co. of Texas.

While I have shown only three holding devices 11, it is understood that the usual fishing net would require a great many holding devices spaced along the corkline 10 and the net 16, 17.

The loops 13, 14 and 15 are composed of a mono-filament line such as that known as Hi-Seas Mono Filament, sold by Hi-Seas Industries, Inc., 325 Spring Street, New York, N.Y. 10013. This single filament (mono-filament) line has a diameter of 1.8 milimeters and will rupture when placed under 250 pounds in tension. A single filament plastic cord is preferred for the loops 13, 14 and 15, but the exact make and type described above is not required. That type, however, has "memory" which is very helpful when the holding devices are reused as they tend to correctly position themselves with very little effort on the part of the fisherman who is installing the net.

Figure 4:
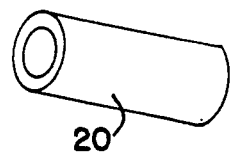
FIG. 4 illustrates a cylindrical metal piece which when crimped comprises part 12.
Figure 5:
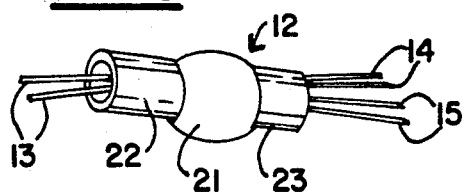
FIG. 5 is a side view of the cylinder of FIG. 4; the loops 13, 14 and 15 being included.

The crimped cylinder 12 may be made from a metallic cylinder 20 (FIG. 4). After the loops 13, 14 and 15 have been added to the cylinder the ends 22 and 23 of the cylinder are crimped as shown in FIG. 5. This secures the loops 13, 14 and 15 to the crimped cylinder 12.

Figure 6:
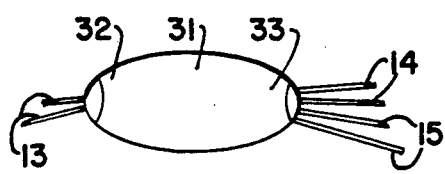
FIG. 6 is another form of crimped device 12.

A modified form of crimped cylinder is shown in FIG. 6. To make this form of crimped cylinder the cylinder 20 of FIG. 4 has the mono-filament loops 13, 14 and 15 inserted in it. It is then crimped to a shape that has an elliptical cross-section wherein the two ends 32 and 33 are smaller than the center 31; see FIG. 6.

FIGS. 8 and 9 show apparatus, for use in the field, for making holding devices 11 as shown in FIG. 3. The base 80 has three sets of holes 82, 84 and 86, and the crimping device 81. The fact that each set of holes has three holes permits selection of the desired lengths for each of the loops 13, 14 and 15 (FIG. 3). With the pins 83, 85 and 87 in the selected holes the three loops 13, 14 and 15 are formed around the pins 83, 85 and 87 respectively. The cylinder 20 (FIG. 4) is mounted in the hand operated crimping machine 81 and the loops 13, 14 and 15 are fed through the central opening of the cylinder 20. The crimping machine 81 is then operated to crimp the cylinder 20 and thereby clamp the loops 13, 14 and 15 in the crimped cylinder.

FIG. 10 shows how the mono-filament flexible cord may be fed from reel 90 through the cylinder 20 and around the pins 83, 85 and 87 to form the three loops 13, 14 and 15.

FIG. 11 shows apparatus for spacing the corks on the corkline. Corkline 10 from reel 90 is fed through clamps 91 and 92 which are mounted on base 93. The clamps 91 and 92 enable the corkline to be held firm and the corks to be properly spaced while the net devices are being assembled to it.

I claim to have invented:

1. A device, which in cooperation with at least one similar device, is capable of (a) being suspended from a horizontal elongated supporting element and (b) at least partially suspending a fishing net, comprising:
   clamping means in the form of a sleeve with two open ends,
   a first loop extending from one of said ends and comprising means for supporting said clamping means from said element,
   second and third loops extending away from said other, end, one of which second and third loops is longer than the other and comprising means for supporting said net,
   each of said three loops comprising a cord extending into said sleeve, and said clamping means comprising means for clamping said cords in said sleeve together.

2. A device as defined in claim 1, in which said second and third loops are composed of a material which as memory and comprising means for tending, when reused, to position themselves in the same position they had during their previous use.

3. A device as defined in claim 1, in which each cord is a mono-filament line.

4. A process for making a device, which in cooperation with at least one similar device, is capable of (a) being suspended from a horizontal elongated supporting element and (b) at least partially suspending a fishing net, comprising:
   providing a clamping means in the form of a sleeve with two open ends,
   providing a first loop extending from one of said ends and comprising means for supporting said clamping means from said element,
   providing second and third loops extending away from said other end one of which second and third loops is longer than the other and comprising means for supporting said net,
   providing each of said three loops with a cord extending into said sleeve, and
   compressing said clamping means to clamp said cords together in said sleeve.

5. The process of claim 4, comprising:
   providing a plurality of said devices,
   making said second loop shorter than said third loop in each of said devices,
   attaching said first loops of each of said devices to said horizontal supporting element, to thereby suspend said second and third loops of the devices from said element,
   passing the third loop of one of said devices through the second loop of such one device and then through a plurality of openings in the net,
   passing the second loop of another one of said devices through said third loop, and
   passing the third loop of said another one of said devices through the second loop of said another one of said devices.

6. The process of claim 4 in which the step of providing each of the said three loops with a cord comprises providing each of the said three loops with a mono-filament cord.

* * * * *